(12) United States Patent
Matsumoto

(10) Patent No.: US 9,000,698 B2
(45) Date of Patent: Apr. 7, 2015

(54) MOTOR CONTROLLING APPARATUS

(71) Applicant: Fujitsu Ten Limited, Kobe-shi, Hyogo (JP)

(72) Inventor: Hitoshi Matsumoto, Kobe (JP)

(73) Assignee: Fujitsu Ten Limited, Kobe-shi (JP)

(*) Notice: Subject to any disclaimer, the term of this patent is extended or adjusted under 35 U.S.C. 154(b) by 220 days.

(21) Appl. No.: 13/745,281

(22) Filed: Jan. 18, 2013

(65) Prior Publication Data

US 2013/0221886 A1    Aug. 29, 2013

(30) Foreign Application Priority Data

Feb. 29, 2012 (JP) ................... 2012-043736

(51) Int. Cl.
| | |
|---|---|
| H02P 1/04 | (2006.01) |
| H02P 6/00 | (2006.01) |
| B60W 10/20 | (2006.01) |
| B60W 10/08 | (2006.01) |
| H02P 6/08 | (2006.01) |
| B62D 5/065 | (2006.01) |

(52) U.S. Cl.
CPC .............. *H02P 6/002* (2013.01); *B60W 10/20* (2013.01); *B60W 10/08* (2013.01); *H02P 6/085* (2013.01); *B62D 5/065* (2013.01)

(58) Field of Classification Search
CPC ..... B60W 10/08; B60W 10/20; Y02T 10/705
USPC ...................................... 318/400.17
See application file for complete search history.

(56) References Cited

U.S. PATENT DOCUMENTS

| | | | | |
|---|---|---|---|---|
| 7,571,040 | B2* | 8/2009 | Murty et al. ................... | 701/41 |
| 2011/0254472 | A1* | 10/2011 | Forster et al. .................. | 318/3 |

FOREIGN PATENT DOCUMENTS

| | | |
|---|---|---|
| JP | A-7-300011 | 11/1995 |
| JP | A-2004-080994 | 3/2004 |
| JP | A-2005-124247 | 5/2005 |

\* cited by examiner

*Primary Examiner* — Erick Glass
(74) *Attorney, Agent, or Firm* — Oliff PLC

(57) ABSTRACT

A motor controlling apparatus includes: a controller configured to (i) compute a target duty cycle value which is a target value for a duty cycle used for a pulse width modulation control for controlling a motor, and (ii) specify 100% as a duty cycle specified value when the target duty cycle value is greater than an upper limit value which is below 100%, or specify 0% as the duty cycle specified value when the target duty cycle value is less than a lower limit value which exceeds 0%; and a control signal generator that generates a control signal for controlling the motor at the duty cycle specified value specified by the controller.

13 Claims, 12 Drawing Sheets

MOTOR CONTROLLING APPARATUS

BACKGROUND OF THE INVENTION

1. Field of the Invention

The invention relates to pulse width modulation control for a current in a coil in a motor.

2. Description of the Background Art

Conventionally, it has been known that a current in a coil in a motor is controlled by using pulse width modulation control. The term pulse width modulation is also referred to as "PWM" below. A direct current motor control apparatus that changes a short cycle of a PWM signal to a long cycle in a region in which a duty cycle of the PWM signal is high, is known as one of technologies relating to the PWM control of a motor.

When a duty cycle is high, close to "100%," in the PWM control, there is a case where an OFF period of a signal controlling a switching element is shorter than a response time period required for the switching element and/or a driving circuit thereof. In such a case of the high duty cycle, a current of a controlled object cannot be cut off in the OFF period in which the current needs to be cut off. Thus, an energy loss may occur by switching. Similarly, when a duty cycle is low, close to "0%," a loss of switching may occur because the target current does not flow in an ON period in which the target current needs to flow. The term "loss by switching" collectively refers to both problems.

With reference to FIG. 1, an example of a loss by switching in a case of using an n-channel MOSFET (metal-oxide-semiconductor field-effect transistor), is explained. An upper drawing in FIG. 1 illustrates a timeline chart showing an example of the MOSFET switching control signal. A lower drawing in FIG. 1 illustrates a timeline chart showing an example of a gate voltage of the MOSFET.

Symbols Ton and Toff represent the ON period and the OFF period respectively. For example, when the OFF period Toff is shorter than a response time of a driving circuit of the MOSFET, the gate voltage of the MOSFET does not become less than an on-state voltage Vt during the OFF period Toff. As a result, since the MOSFET is not turned off, the target current is not cut off.

In a case of the PWM control, when the OFF period or the ON period of the pulse defined by a duty cycle is shorter than a response time of the switching element and/or a driving circuit thereof, a response may not catch up to a switching operation. Thus there is a problem where control efficiency decreases.

SUMMARY OF THE INVENTION

According to one aspect of the invention, a motor controlling apparatus includes: a controller configured to (i) compute a target duty cycle value which is a target value for a duty cycle used for a pulse width modulation control for controlling a motor, and (ii) specify 100% as a duty cycle specified value when the target duty cycle value is greater than an upper limit value which is below 100%, or specify 0% as the duty cycle specified value when the target duty cycle value is less than a lower limit value which exceeds 0%; and a control signal generator that generates a control signal for controlling the motor at the duty cycle specified value specified by the controller. Thus, a loss by switching in a PWM control is reduced. Accordingly, efficiency in the PWM control is improved.

According to another aspect of the invention, a motor controlling apparatus includes: a controller configured to (ii) compute a target duty cycle value which is a target value for a duty cycle used for a pulse width modulation control for controlling a motor, and (ii) specify a duty cycle specified value for each of a plurality of consecutive pulse width modulation cycles to make an average value of the duty cycles of the plurality of consecutive pulse width modulation cycles be the target duty cycle value computed by the controller; and a control signal generator that generates a control signal for controlling the motor at the duty cycle specified value specified by the controller. Thus, a loss by switching in a PWM control is reduced. Accordingly, efficiency in the PWM control is improved.

Therefore, an object of the invention is to improve control efficiency by reducing a loss by switching in PWM control.

These and other objects, features, aspects and advantages of the invention will become more apparent from the following detailed description of the invention when taken in conjunction with the accompanying drawings.

DESCRIPTION OF THE EMBODIMENTS

With reference to the drawings, embodiments of the invention are explained.

<1. First Embodiment>
<1-1. Hardware Configuration>

With reference to the attached drawings, the embodiments are explained below. A case where a control apparatus in the embodiments is applied to an electrically assisted hydraulic power steering is explained below. However, the control apparatus in the embodiments may be used for a wide range of products that control vehicle-mounted motors, such as electrically assisted power steering apparatuses and electric powered cooling fans. Moreover, the control apparatus in the embodiments may be used for a wide range of products that control motors of household appliances, such as washing machines and air conditioners. Furthermore, the control apparatus in the embodiments may be used for a wide range of other apparatuses that implement PWM control.

Figure 1:
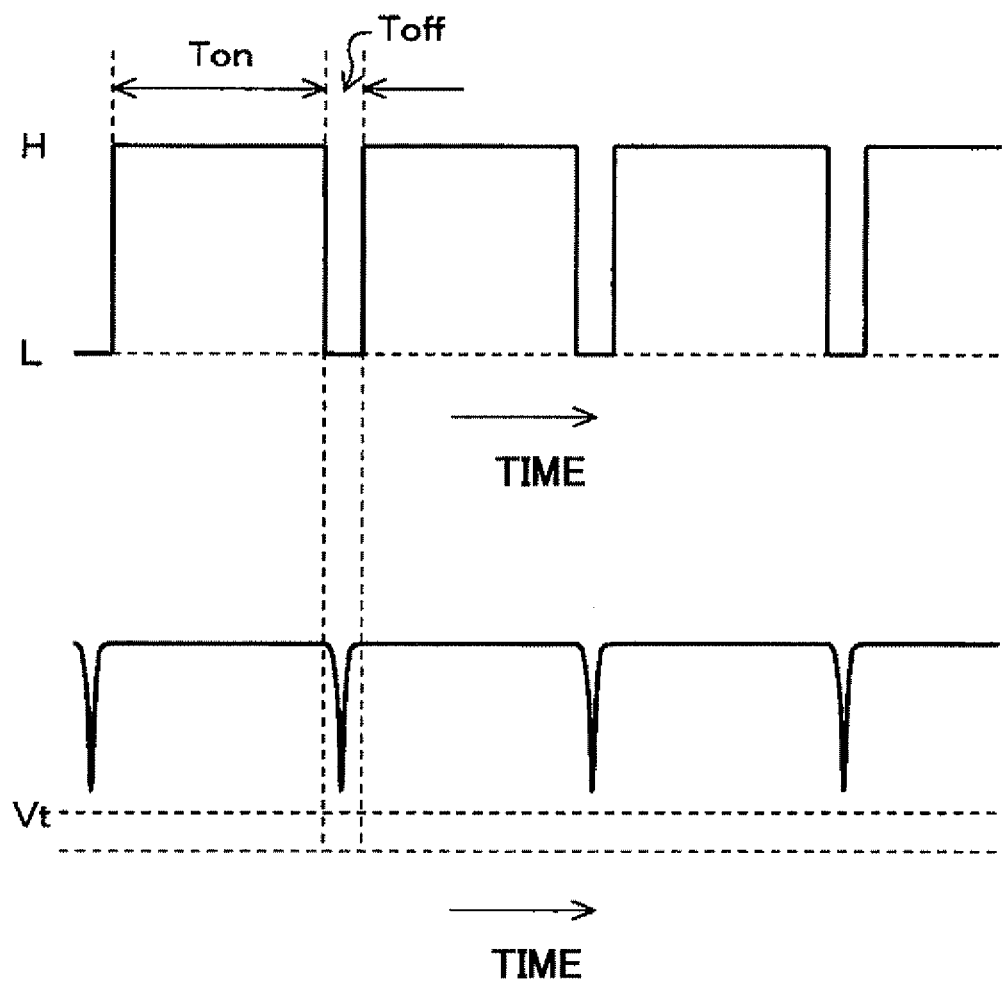
FIG. 1 illustrates timeline charts showing an example of a MOS switching control signal and an example of a gateway voltage.
Figure 2:
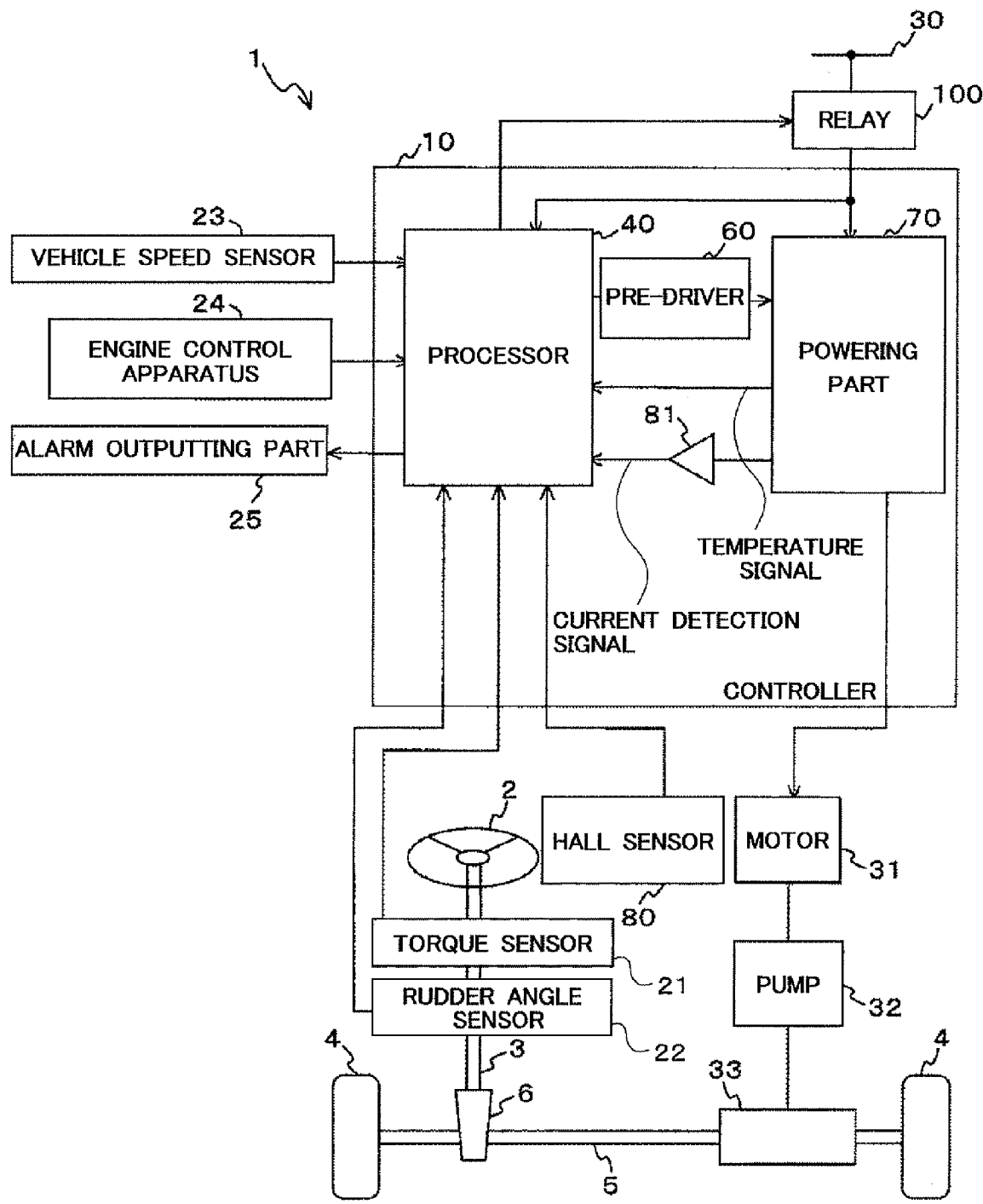
FIG. 2 is an example of a hardware configuration of an electrically assisted hydraulic power steering apparatus.

FIG. 2 is an example of a hardware configuration of the electrically assisted hydraulic power steering apparatus. A reference numeral 4 in FIG. 2 represents front wheels of a vehicle. Reference numerals 2, 3, 5, and 6 represent a steering wheel, a column shaft, a rack and a pinion, respectively, of a steering mechanism of the front wheels 4. Moreover, reference numerals 23, 24, 25 and 30 represent a vehicle speed sensor, an engine control apparatus [electronic fuel injection-electronic control unit (EFI-ECU)], an alarm outputting part and a power source respectively.

An electrically assisted hydraulic power steering apparatus 1 includes a controller 10, a torque sensor 21, a rudder angle sensor 22, a motor 31, a pump 32, a power cylinder 33, and a hall sensor 80.

The torque sensor 21 and the rudder angle sensor 22 detect a steering force and a steering angle of the steering wheel 2 respectively. The vehicle speed sensor 23 detects a speed of the vehicle. The engine control apparatus 24 is an electronic control apparatus that controls an engine provided in the vehicle, and detects a rotation speed of the engine to control the engine.

The controller 10 is an electronic circuit including a microcomputer. The controller 10 drives the motor 31 in accordance with the steering force, the steering angle, the vehicle speed and the rotation speed of the engine detected by the torque sensor 21, the rudder angle sensor 22, the vehicle speed sensor 23 and the engine control apparatus 24 respectively. The controller 10 receives a signal indicating a state of an ignition switch from the engine control apparatus 24.

The motor 31 is a three phase synchronous motor [brushless direct current (DC) motor] for providing power to the pump 32. By providing hydraulic pressure to an oil chamber of the power cylinder 33, the pump 32 adds an assisting force for assisting the steering force of a driver to the rack 5 that is the steering mechanism of the front wheels 4.

The controller 10 includes a processor 40, a pre-driver 60, a powering part 70, an amplifier 81, and a relay 100. The processor 40 generates a control signal for PWM driving of the motor 31 in accordance with the steering force, the steering angle, the vehicle speed and the rotation speed of the engine detected by the torque sensor 21, the rudder angle sensor 22, the vehicle speed sensor 23 and the engine control apparatus 24 respectively.

The hall sensor 80 detects a position of a rotor of the motor 31. The processor 40 determines a phase coil to be electrified in accordance with a signal detected by the hall sensor 80. The processor 40 outputs a phase current control signal that turns on and off a switching element that controls a phase current flowing in each phase coil of the motor 31, by using a PWM control. The pre-driver 60 amplifies the phase current control signal output from the processor 40 and supplies the amplified phase current control signal to the powering part 70. The powering part 70 drives the switching element that controls the phase current flowing from the power source 30 to each phase coil of the motor 31, in accordance with the amplified phase current control signal.

The processor 40 detects an abnormality of the electrically assisted hydraulic power steering apparatus 1 based on a signal of a temperature detected in the powering part 70, each phase current of the motor 31, i.e. a current detection signal indicating a detected drive current value, and a voltage of the power source 30. The amplifier 81 amplifies the current detection signal and supplies the amplified current detection signal to the processor 40.

The processor 40 generates a relay drive signal for driving the relay 100. When detecting a predetermined abnormality, the processor 40 controls the relay 100 to stop power supplied from the power source 30 to the powering part 70. Moreover, the processor 40 outputs a warning that informs the driver of the abnormality via the alarm outputting part 25. The alarm outputting part 25 may be a meter or a navigation apparatus in the vehicle.

Figure 3:
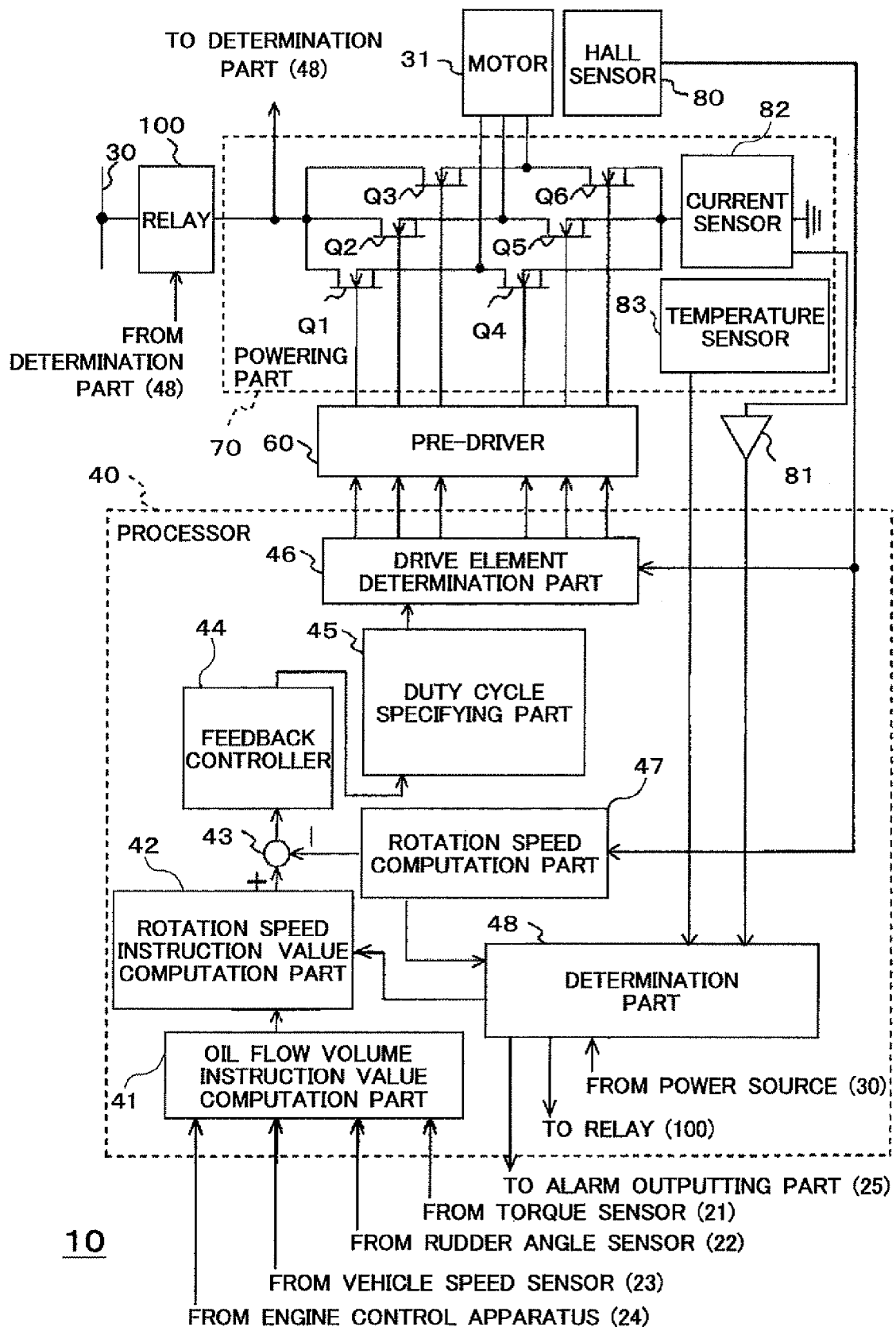
FIG. 3 illustrates a configuration example of a controller.

FIG. 3 illustrates an example of a configuration of the controller 10. The controller 10 includes an oil flow volume instruction value computation part 41, a rotation speed instruction value computation part 42, a subtracting part 43, a feedback controller 44, a duty cycle specifying part 45, a drive element determination part 46, a rotation speed computation part 47 and a determination part 48. Operations of the constituent parts 41 to 48 included in the processor 40 are implemented, for example, by the microcomputer included in the controller 10.

The powering part 70 includes switching elements Q1 to Q6, a current sensor 82 and a temperature sensor 83. The switching elements Q1 to Q6 are also collectively referred to as "switching element Q" in the below explanation.

The oil flow volume instruction value computation part 41 computes an instruction value for an hydraulic oil flow volume to be discharged from the pump 32, in accordance with the steering force, the steering angle and the vehicle speed detected by the torque sensor 21, the rudder angle sensor 22 and the vehicle speed sensor 23 respectively. The oil flow volume instruction value computation part 41 computes a base volume for the flow volume based on an operation state of the steering wheel 2 detected based on the steering force and the steering angle. Moreover, the oil flow volume instruction value computation part 41 corrects the computed flow volume such that the flow volume becomes less as the vehicle speed increases. Furthermore, the oil flow volume instruction value computation part 41 computes the instruction value for the hydraulic oil flow volume by correcting the computed flow volume as described above.

In addition, the oil flow volume instruction value computation part 41 determines to allow or not allow a steering assist control implemented by driving the pump 32, based on a driving state of the engine determined based on the rotation speed of the engine transmitted from the engine control apparatus 24. Concretely, when having determined that the engine is not working, the oil flow volume instruction value computation part 41 determines that an alternator (not illustrated) that charges the power source 30 supplying power to drive the pump 32 is not generating power, and does not allow the steering assist control to be implemented to prevent decrease in charging rate of the power source 30. When the instruction value for the hydraulic oil flow volume is computed, only one of the torque sensor 21 and the rudder angle sensor 22 may be used to detect the steering state of the steering wheel 2.

The rotation speed instruction value computation part 42 determines a rotation speed instruction value that is a value instructing the rotation speed of the motor 31, in accordance with the instruction value for the hydraulic oil flow volume computed by the oil flow volume instruction value computation part 41. The subtracting part 43 computes a difference between the rotation speed instruction value and an actual rotation speed of the motor 31 computed by the rotation speed computation part 47. The feedback controller 44 computes an instruction value Dc for the duty cycle in an electrifying period in which the motor 31 is electrified, by use of a proportional-integral-derivative (PID) operation in accordance with the difference of the rotation speed. The feedback controller 44 that computes the instruction value Dc for the duty cycle is a target value computation part.

The duty cycle specifying part 45 fixes and maintains the instruction value Dc for the duty cycle at "100%" when the instruction value Dc output from the feedback controller 44 is greater than a predetermined upper limit value Du. In other words, when the instruction value Dc is greater than the upper limit value Du, the duty cycle specifying part 45 specifies "100%" as a duty cycle Ds defining an electrifying period in which the motor 31 is actually electrified. The upper limit value Du is set at a value less than "100%."

The duty cycle specifying part 45 fixes and maintains the instruction value Dc at "0%" when the instruction value Dc for the duty cycle is less than a predetermined lower limit value Dd. In other words, when the instruction value Dc is less than the lower limit value Dd, the duty cycle specifying part 45 specifies "0%" as the duty cycle Ds defining the electrifying period in which the motor 31 is actually electrified. The lower limit value Dd is set at a value greater than "0%." When the instruction value Dc for the duty cycle is greater than the lower limit value Dd and also less than the upper limit value Du, the duty cycle specifying part 45 specifies the instruction value Dc as the duty cycle Ds. The instruction value Dc for the duty cycle output by the feedback controller 44 may be referred to as "duty cycle instruction value Dc" in the explanation below. Moreover, the instruction value Dc for the duty cycle is a target duty cycle that is a target value for the duty cycle in the electrifying period in which the motor 31 is electrified. Furthermore, the specified value Ds for the duty cycle specified by the duty cycle specifying part 45 may be referred to as "duty cycle specified value Ds."

The drive element determination part 46 generates the phase current control signal having a duty cycle specified by the duty cycle specifying part 45, based on a signal output by the hall sensor 80 and based on the duty cycle specified value Ds. The phase current control signal is a control signal that turns on and off the switching elements Q. The drive element determination part 46 controls the phase current flowing from the power source 30 to each phase coil in the motor 31 by switching on/off the elements Q by the phase current control signal.

Figure 4:
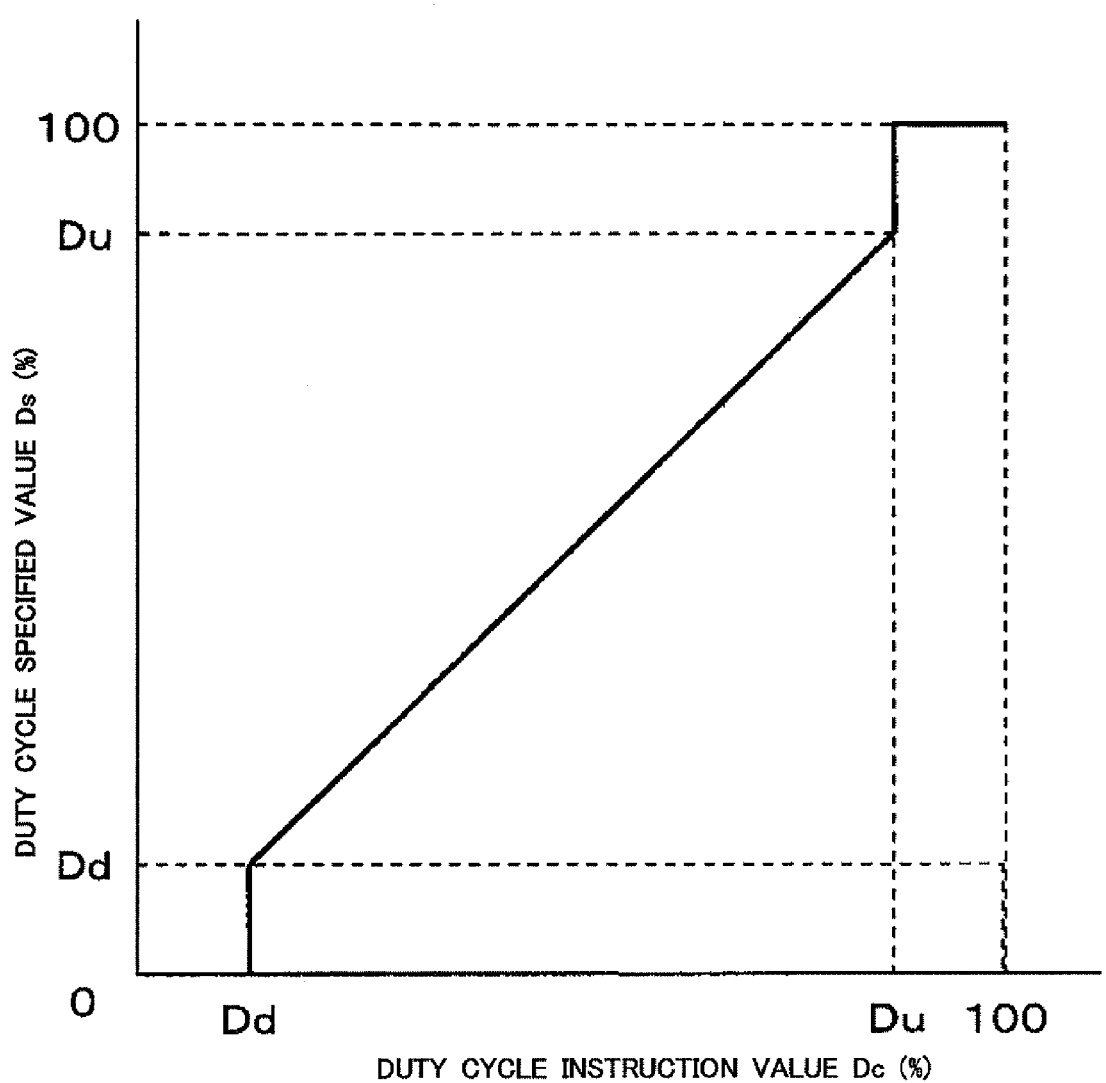
FIG. 4 explains a relation between a duty cycle instruction value output from a feedback controller and a duty cycle specified value specified by a duty cycle specifying part.

FIG. 4 explains a relation between the duty cycle instruction value Dc and the duty cycle specified value Ds. As illustrated in FIG. 4, when the duty cycle instruction value Dc<the lower limit value Dd, the duty cycle specified value Ds is "0%." When the lower limit value Dd≤the duty cycle instruction value Dc≤the upper limit value Du, the duty cycle specified value Ds is equal to the duty cycle instruction value Dc. When the upper limit value Du<the duty cycle instruction value Dc, the duty cycle specified value Ds is "100%."

For example, in a case of a duty cycle less than the upper limit value Du, the upper limit value Du is set to a value in which an OFF period of the PWM control is not shorter than response times of the switching elements Q and the pre-driver 60, i.e. a value greater than the response times. Moreover, in a case of a duty cycle greater than the lower limit value Dd, the lower limit value Dd is set to a value in which an ON period of the PWM control is not shorter than the response times of the switching elements Q and the pre-driver 60, i.e. a value greater than the response times. Since the upper limit value Du and the lower limit value Dd are set as described above, regardless of the duty cycle instruction value Dc, the ON period and the OFF period of the phase current control signal that turns on and off the switching elements Q are prevented from becoming shorter than the response times of the switching elements Q and the pre-driver 60. Thus, a loss by switching can be reduced.

Figure 5:
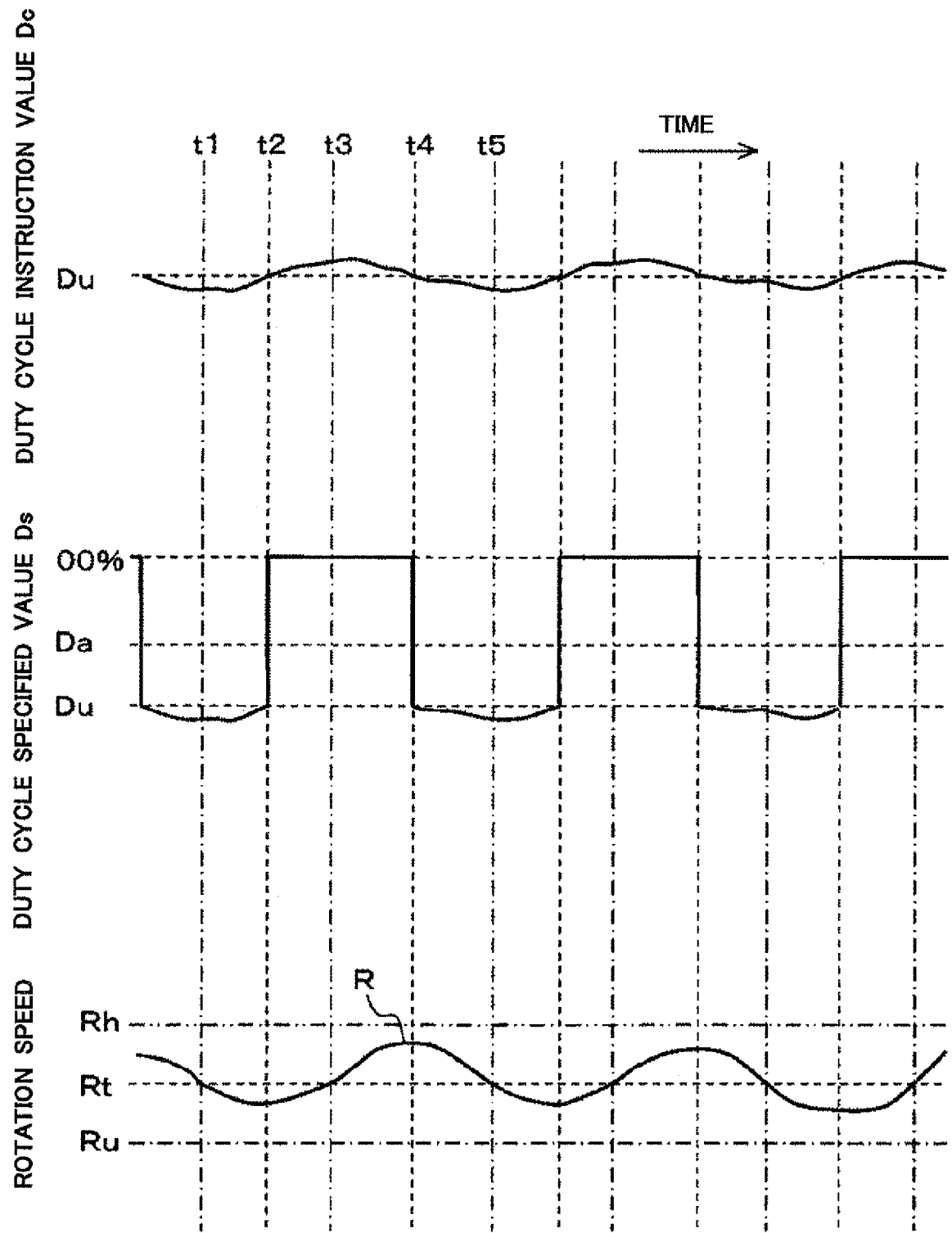
FIG. 5 is a timeline chart indicating a duty cycle instruction value, a duty cycle specified value, and a motor rotation speed.

Next explained is a control of the rotation speed of the motor 31 implemented when the duty cycle instruction value De is fixed by the duty cycle specifying part 45. A top timeline chart in FIG. 5 indicates a shift in the duty cycle instruction value Dc. A mid timeline chart in FIG. 5 indicates a shift in the duty cycle specified value Ds. A bottom timeline chart in FIG. 5 indicates a shift in the rotation speed of the motor 31.

A waveform R indicates a shift in the actual rotation speed of the motor 31. A dotted line Rt indicates the rotation speed instruction value, i.e. a target rotation speed. A dashed dotted line Ru indicates the rotation speed of the motor 31 when the duty cycle equal to the upper limit value Du continues. A long dashed double-dotted line Rh indicates the rotation speed of the motor 31 when the duty cycle continues at "100%." A dotted line Da indicates an average value of the duty cycle specified value Ds. Since the rotation speed instruction value Rt is between the rotation speed Ru and the rotation speed Rh, a duty cycle to realize the rotation speed instruction value Rt is a value between the upper limit value Du and "100%."

When the actual rotation speed R becomes less than the rotation speed instruction value Rt at a time point t1, the duty cycle instruction value Dc starts to increase by a feedback control implemented by the feedback controller 44. The duty cycle specified value Ds is equal to the duty cycle instruction value Dc until a time point t2 where the duty cycle instruction value Dc exceeds the upper limit value Du.

When the duty cycle instruction value Dc exceeds the upper limit value Du at the time point t2, the duty cycle specified value Ds becomes "100%." Since the duty cycle instruction value Dc corresponding to the rotation speed instruction value Rt is less than "100%," the actual rotation speed R exceeds the rotation speed instruction value Rt at a time point t3.

When the actual rotation speed R exceeds the rotation speed instruction value Rt, the duty cycle instruction value Dc starts to decrease by the feedback control implemented by the feedback controller 44. When the duty cycle instruction value Dc becomes less than the upper limit value Du at a time point t4, the duty cycle specified value Ds becomes equal to the duty cycle instruction value Dc.

Since the duty cycle specified value Ds decreases, the actual rotation speed R starts to decrease from the time t4. Thus, the actual rotation speed R becomes less than the rotation speed instruction value Rt at a time point t5. When the actual rotation speed R becomes less than the rotation speed instruction value Rt, the duty cycle instruction value Dc starts to increase again by the feedback control implemented by the feedback controller 44.

Even if the duty cycle instruction value Dc is fixed as described above, the average value Da of the duty cycle specified value Ds for the phase current control signal stays between the upper limit value Du and "100%" due to the feedback control by the feedback controller 44. Moreover, even if the rotation speed instruction value Rt is between the rotation speed Ru for the case where the duty cycle equal to the upper limit value Du continues and the rotation speed Rh for the case where the duty cycle continues at "100%," the actual rotation speed R of the motor 31 can be controlled to change in a range between the rotation speed Ru and the rotation speed Rh. Similarly, even if the duty cycle instruction value Dc is fixed at "0%," the actual rotation speed R of the motor 31 can be controlled to change in the range between the rotation speed Ru and the rotation speed Rh.

Here, FIG. 3 is referred again. The rotation speed computation part 47 determines the position of the rotor based on the signal output by the hall sensor 80, and computes the rotation speed of the motor 31 in accordance with a change of the position of the rotor. The current sensor 82 detects a total value of the phase currents of the motor 31 and outputs a current detection signal indicating detected values. The temperature sensor 83 detects the temperature of the powering part 70 and outputs the signal of a temperature (temperature signal) indicating the detected temperature value.

The determination part 48 detects an abnormality caused in the electrically assisted hydraulic power steering apparatus 1, in accordance with the temperature signal, the current detection signal, the voltage of the power source 30, and the rotation speed of the motor 31 computed by the rotation speed computation part 47. The determination part 48 generates a relay drive signal for driving the relay 100. When having detected the predetermined abnormality, the determination part 48 controls the relay 100 to stop the current supplied from the power source 30 to the powering part 70.

The determination part 48 further generates a stop signal for stopping the rotation of the motor 31 and/or a restriction signal for restricting the rotation of the motor 31. The rotation speed instruction value computation part 42 stops and/or restricts the rotation of the motor 31 in accordance with the stop signal and/or the restriction signal. Moreover, the determination part 48 outputs a waning that informs the driver of the abnormality through the alarm outputting part 25.

<1.2 Process Implemented by the Processor>

Figure 6:
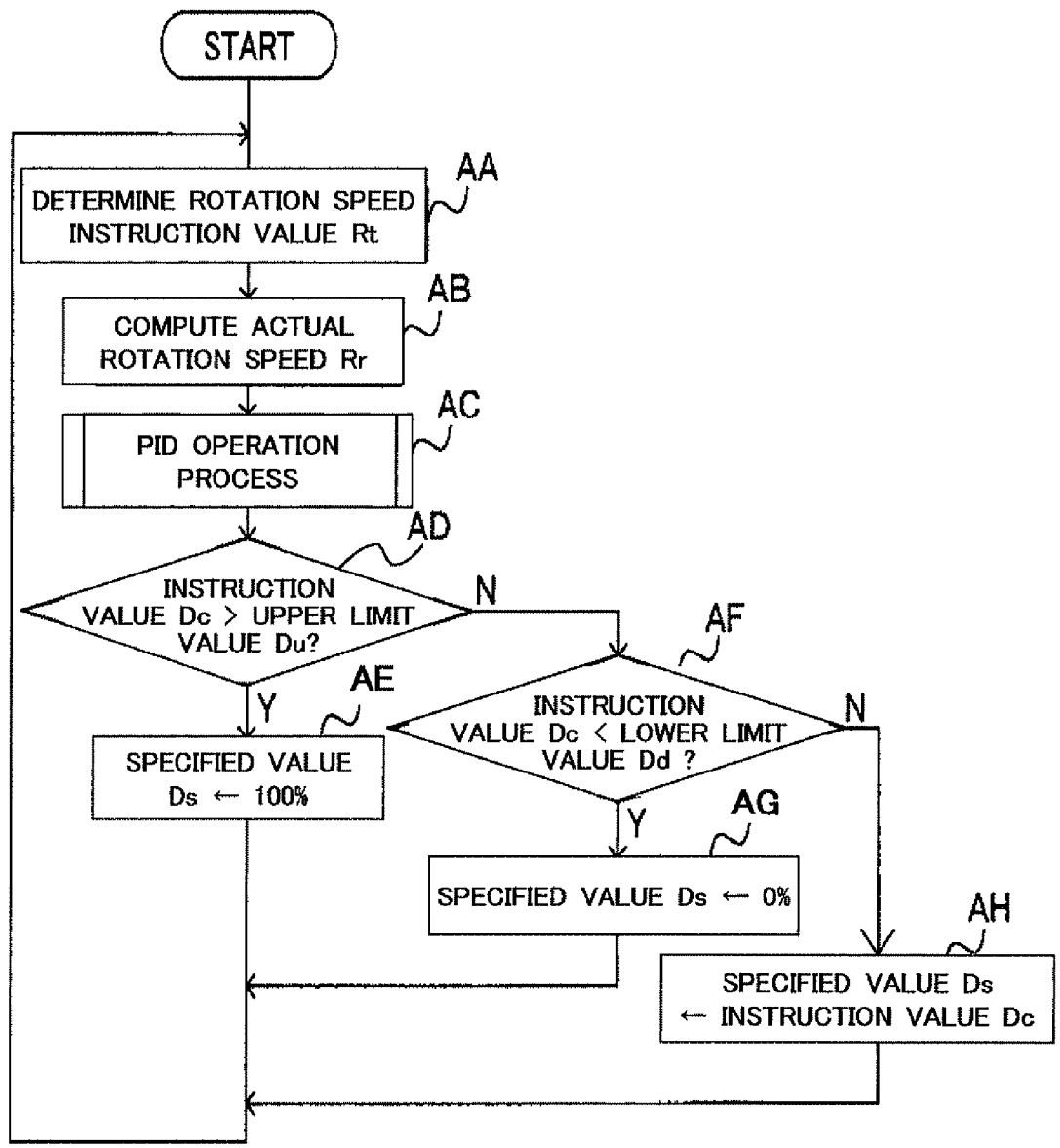
FIG. 6 is a flowchart explaining a first example of operations implemented by a processor.

Next explained is a process implemented by the processor 40 when the duty cycle specified value Ds is determined. FIG. 6 explains a first example of operations implemented by the processor 40. A series of the operations explained with reference to FIG. 6 may be deemed as a method including plural steps, and in this case, "operation" can be read as "step," which is also applied to operations explained with reference to FIG. 7, FIG. 9 and FIG. 12.

In an operation AA, the rotation speed instruction value computation part 42 determines the rotation speed instruction value Rt. In an operation AB, the rotation speed computation part 47 computes an actual rotation speed Rr of the motor 31. In an operation AC, the feedback controller 44 computes the duty cycle instruction value Dc by a PID operation process based on the difference between the rotation speed instruction value Rt and the actual rotation speed Rr.

Figure 7:
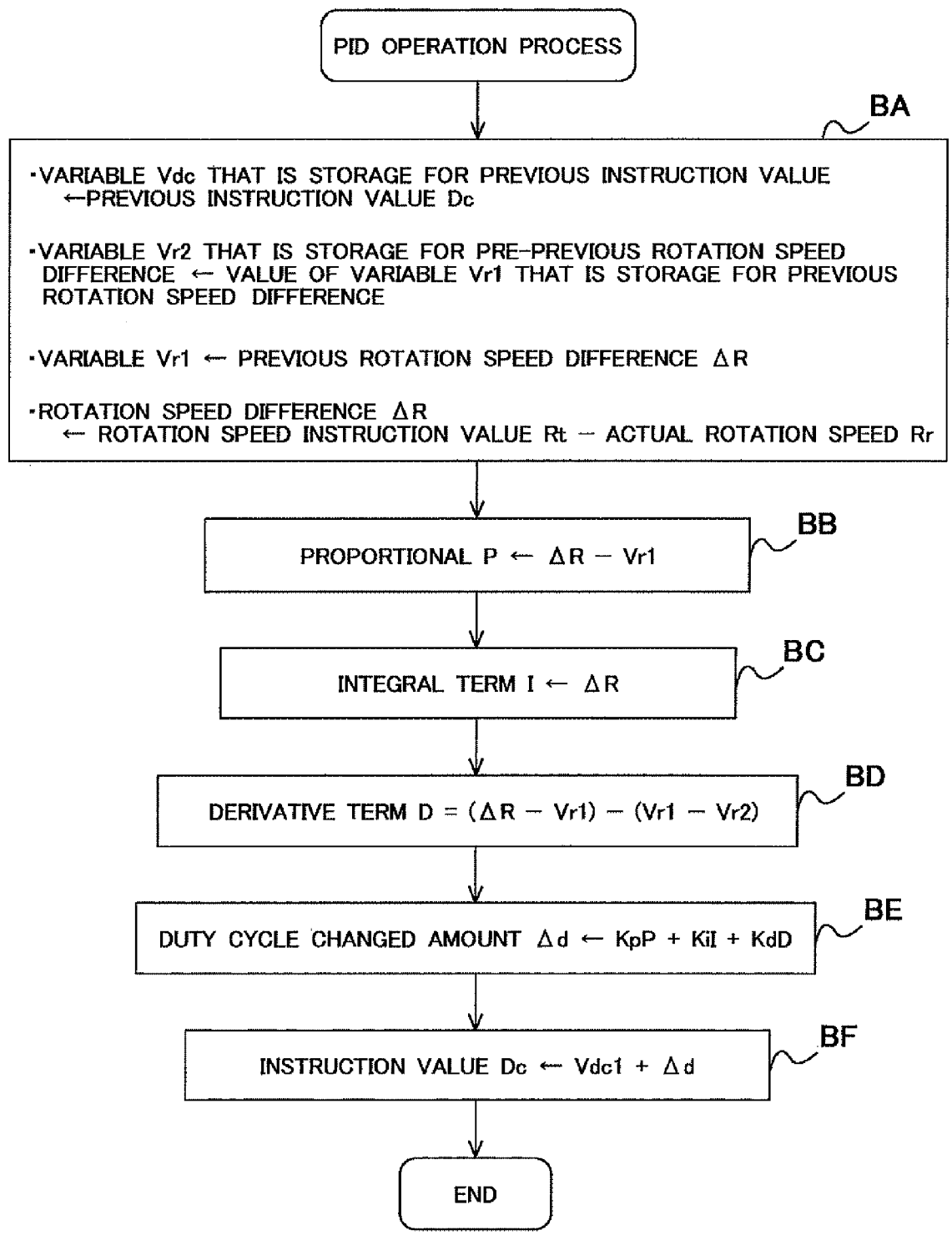
FIG. 7 is a flowchart explaining an example of a Proportional-Integration-Derivative (PID) operation process shown in FIG. 6.

FIG. 7 explains an example of the PID operation process shown in FIG. 6. In an operation BA, the feedback controller 44 stores the duty cycle instruction value Dc computed in a preceding PID operation process to a variable Vdc that is a storage for a previous instruction value. Moreover, the feedback controller 44 stores a rotation speed difference ΔR used in the preceding PID operation process to a variable Vr1 that is a storage for a previous rotation speed difference, and stores a value of the variable Vr1 used in the preceding PID operation process to a variable Vr2 that is a storage for a pre-previous rotation speed difference. The feedback controller 44 computes the rotation speed difference ΔR=(Rt−Rr).

In an operation BB, the feedback controller 44 computes a proportional P=(the rotation speed difference ΔR−the previous rotation speed difference Vr1). In an operation BC, the feedback controller 44 substitutes the rotation speed difference ΔR for an integral term I. In an operation BD, the feedback controller 44 computes a derivative term D=(rotation speed difference ΔR−previous rotation speed difference Vr1)−(previous rotation speed difference Vr1−pre-previous rotation speed difference Vr2).

In an operation BE, the feedback controller 44 multiplies the proportional P, the integral term I and the derivative term D by gains Kp, Ki and Kd respectively, and then sums the multiplied values to determine a duty cycle changed amount Δd. In an operation BF, the feedback controller 44 computes the duty cycle instruction value Dc by adding the changed amount Δd to the previous instruction value Vdc.

Here, FIG. 6 is referred again. In an operation AD, the duty cycle specifying part 45 determines whether or not the duty cycle instruction value Dc is greater than the upper limit value Du. When the duty cycle instruction value Dc is greater than the upper limit value Du (Y in the operation AD), the process moves to an operation AE. When the duty, cycle instruction value Dc is not greater than the upper limit value Du (N in the operation AD), the process moves to an operation AF. In the operation AE, the duty cycle specifying part 45 sets the duty cycle specified value Ds to "100%." Then, the process moves back to the operation AA.

In the operation AF, the duty cycle specifying part 45 determines whether or not the duty cycle instruction value Dc is less than the lower limit value Dd. When the duty cycle instruction value Dc is less than the lower limit value Dd (Y in the operation AF), the process moves to an operation AG. When the duty cycle instruction value Dc is not less than the lower limit value Dd (N in the operation AF), the process moves to an operation AH.

In the operation AG, the duty cycle specifying part 45 sets the duty cycle specified value Ds to "0%." Then the process moves back to the operation AA. In the operation AH, the duty cycle specifying part 45 specifies the duty cycle instruction value Dc as the duty cycle specified value Ds.

<1.3. Effects of the Embodiment>

According to this embodiment, the ON period and the OFF period of the phase current control signal that turns on and off the switching elements for the PWM control are prevented from becoming shorter than the response times of the switching elements and driving circuits thereof. As a result, the loss by switching is reduced, and efficiency in the PWM control is improved.

Moreover, even if the duty cycle instruction value which exceeds the predetermined upper limit value is fixed at "100%," the average value of the duty cycles of the phase current control signal is between the upper limit value and "100%." Therefore, the motor can be rotated at the target rotation speed that is realized at a duty cycle which exceeds the upper limit value. Similarly, even if the duty cycle instruction value which is below the predetermined lower limit value is fixed at "0%," the average value of the duty cycles of the phase current control signal is between the lower limit value and "0%." Therefore, the motor can be rotated at the target rotation speed that is realized at a duty cycle which is below the lower limit value.

Furthermore, according to this embodiment, even if the duty cycle instruction value Dc exceeds the upper limit value Du or is below the lower limit value Dd, the ON period and the OFF period of the phase current control signal are prevented from becoming shorter than the response times of the switching elements and driving circuits thereof, without changing a cycle of the PWM control. As a result, a process of the PWM control becomes easier as compared with a case where the cycle of the PWM control is changed. In addition, the PWM control implemented in an unfavorable cycle, for example, audio frequency, due to the changing of the cycle of the PWM control can be prevented.

<2. Second Embodiment>

Next explained is anther embodiment of the electrically assisted hydraulic power steering apparatus 1. A duty cycle specifying part 45 in this embodiment determines a duty cycle specified value Ds such that an average of duty cycles of a phase current control signal in a set of PWM cycles (hereinafter referred to as PWM cycle set) is equal to a duty cycle instruction value De, when the duty cycle instruction value Dc is greater than an upper limit value Du.

For example, the duty cycle specifying part 45 specifies the duty cycle of the phase current control signal per PWM cycle, to cause to continuously appear the PWM cycle sets in each of which the average of the duty cycles of the phase current control signal becomes the duty cycle instruction value Dc by implementing a PWM control in a plurality of different duty cycles.

Figure 8:
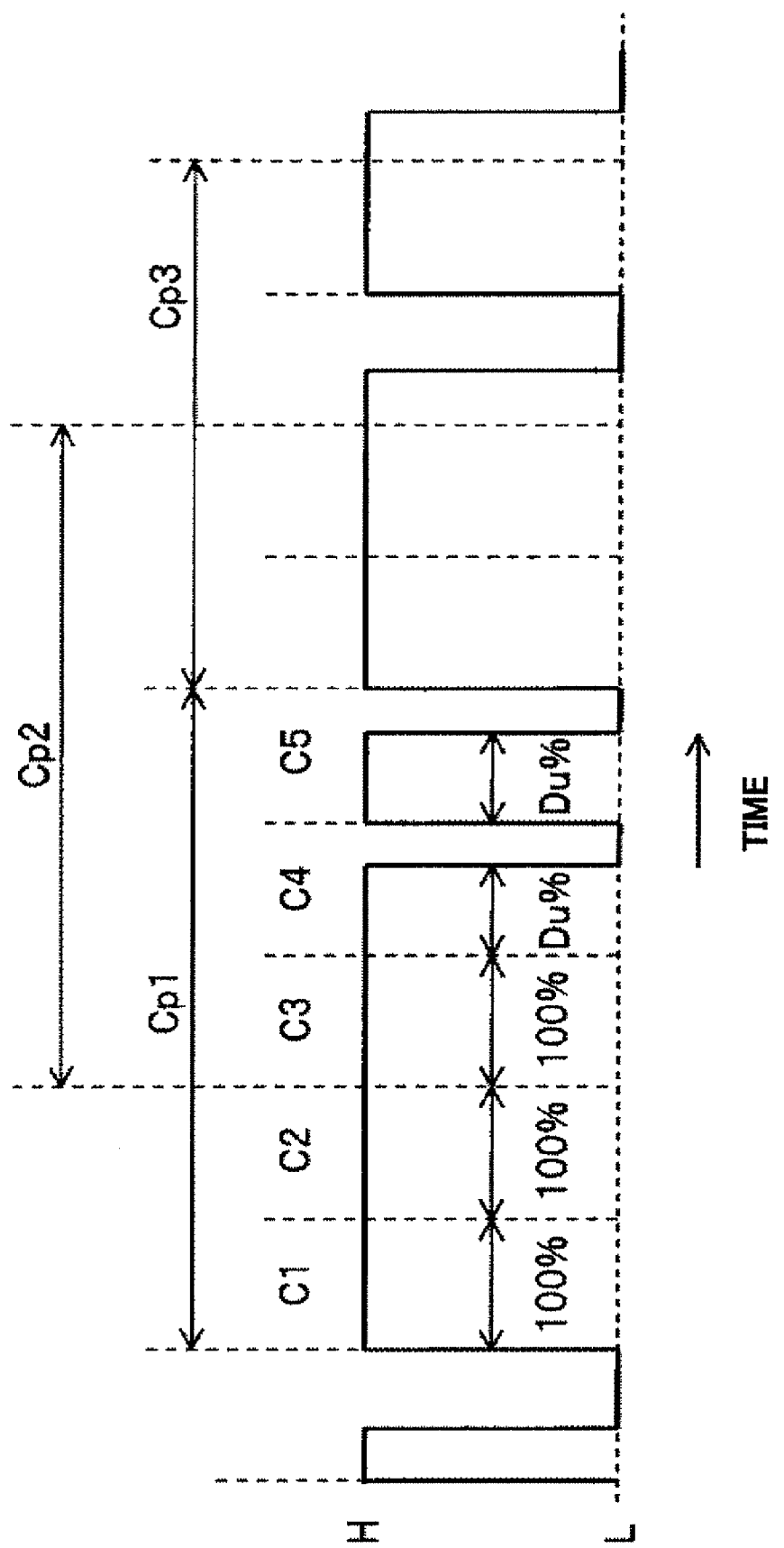
FIG. 8 is a timeline chart illustrating a first example of a phase current control signal.

FIG. 8 is a timeline chart illustrating a first example of the phase current control signal. Duty cycles of the phase current signal control, i.e. the duty cycle specified values Ds, in respective PWM cycles C1, C2, C3, C4 and C5 are "100%," "100%," "100%," the upper limit value Du (%) and the upper limit value Du (%) respectively. Therefore, an average value Da of the duty cycles in a PWM cycle set Cp1 including PWM cycles C1, C2, C3, C4 and C5 is equal to (300+2×Du)/5. As a result, the average value Da is greater than the upper limit value Du and less than "100%."

As described above, the duty cycle specifying part 45 varies the duty cycle specified value Ds of each of the PWM cycles, such that the average value of the PWM cycles in the PWM cycle set Cp1 becomes closer to the duty cycle instruction value Dc greater than the upper limit value Du and less than "100%." Therefore, without outputting the duty cycle specified value Ds in which a loss by switching may occur because the duty cycle is greater than the upper limit value Du, the PWM control can be implemented at the duty cycle instruction value Dc greater than the upper limit value Du.

The duty cycle specifying part 45 specifies the duty cycle specified values Ds for PWM cycles following the PWM cycle set Cp1, to make an average value of a plurality of PWM cycles in a PWM cycle set Cp1 that starts later than the PWM cycle set Cp1 and that overlaps with the PWM cycle set Cp1, closer to the duty cycle instruction value Dc. Moreover, the duty cycle specifying part 45 specifies the duty cycle specified values Ds for PWM cycles following the PWM cycle set Cp1 to make an average value of a plurality of PWM cycles in a PWM cycle set Cp3 that starts after the PWM cycle set Cp1, closer to the duty cycle instruction value Dc.

As described above, the duty cycle specifying part 45 causes the PWM cycle sets Cp1, Cp2, and Cp3, in which the average value of the plurality of different duty cycles of the phase current control signals become the duty cycle instruction value Dc, to continuously appear.

Similarly, the duty cycle specifying part 45 determines the duty cycle specified value Ds such that the average of duty cycles of the phase current control signals in a PWM cycle set becomes the duty cycle instruction value Dc, when the duty cycle instruction value Dc is less than a lower limit value Dd.

In a case, the duty cycle specifying part 45 determines an upper limit output rate Ru when the duty cycle instruction value Dc is greater than the upper limit value Du. The upper limit output rate Ru is a rate of the number of output times Cu in which the duty cycle specified value Ds same as the upper limit value Du has been output, to a total number Ca of plural PWM cycles, when an average value of the duty cycle specified values Ds for the plural PWM cycles is specified as the duty cycle instruction value Dc. For example, the upper limit output rate Ru is determined based on a formula (1) below.

$$\text{The upper limit output rate } Ru = (1-(Dc-Du)/(1-Du)) \tag{1}$$

The duty cycle specifying part 45 counts the number of output times Cu in which the duty cycle specified value Ds same as the upper limit value Du has been output. The duty cycle specifying part 45 determines whether the duty cycle specified value Ds for each of the PWM cycles is to be set to "100%" or the upper limit value Du, to make the rate of the number of output times Cu to the total number Ca of the plural PWM cycles closer to the upper limit output rate Ru.

For example, during a period in which the duty cycle instruction value Dc>the upper limit value Du, the duty cycle specifying part 45 counts the number of output times Ch in which the duty cycle specified value Ds of "100%" has been output and also counts the number of output times Cu in which the duty cycle specified value Ds same as the upper limit value Du has been output. The total number Ca of the PWM cycles in the period in which the duty cycle instruction value Dc>the upper limit value Du, is a sum (Cu+Ch) of the number of output times Ch in which the duty cycle specified value Ds of "100%" has been output and the number of output times Cu in which the duty cycle specified value Ds same as the upper limit value Du has been output.

When the rate of the number of output times Cu to the total number Ca is less than the upper limit output rate Ru, the duty cycle specifying part 45 sets the duty cycle specified value Ds to the upper limit value Du. When the rate of the number of output times Cu to the total number Ca is not less than the upper limit output rate Ru, the duty cycle specifying part 45 sets the duty cycle specified value Ds to "100%."

Similarly, in a case, the duty cycle specifying part 45 determines a lower limit output rate Rd when the duty cycle instruction value De is less than the lower limit value Dd. The lower limit output rate Rd is a rate of the number of output times Cd in which the duty cycle specified value Ds same as the lower limit value Dd has been output, to the total number Ca of the plural PWM cycles, when an average value of the duty cycle specified value Ds for the plural PWM cycles is specified as the duty cycle instruction value Dc. For example, the lower limit output rate Rd is determined based on a formula (2) below.

$$\text{The lower limit output rate } Rd = (1-(Dd-Dc)/Dd)) \tag{2}$$

The duty cycle specifying part 45 counts the number of output times Cd in which the duty cycle specified value Ds same as the lower limit value Dd has been output. The duty cycle specifying part 45 determines whether the duty cycle specified value Ds for each of the PWM cycles is to be set to "0%" or the lower limit value Dd, to make the rate of the number of output times Cd to the total number Ca of the plural PWM cycles closer to the lower limit output rate Rd.

For example, during a period in which the duty cycle instruction value Dc<the lower limit value Dd, the duty cycle specifying part 45 counts the number of output times Cz in which the duty cycle specified value Ds of "0%" has been output and also counts the output times Cd in which the duty cycle specified value Ds same as the lower limit value Dd has been output. The total number Ca of the PWM cycles in the period in which the duty cycle instruction value Dc<the lower limit value Dd, is a sum (Cd+Cz) of the number of output times Cz in which the duty cycle specified value Ds of "0% has been output and the number of output times Cd in which the duty cycle specified value Ds same as the lower limit value Dd has been output.

When the rate of the number of output times Cd to the total number Ca is less than the lower limit output rate Rd, the duty cycle specifying part 45 sets the duty cycle specified value Ds to the lower limit value Dd. When the rate of the number of output times Cd to the total number Ca is not less than the lower limit output rate Rd, the duty cycle specifying part 45 sets the duty cycle specified value Ds to "0%."

Figure 9:
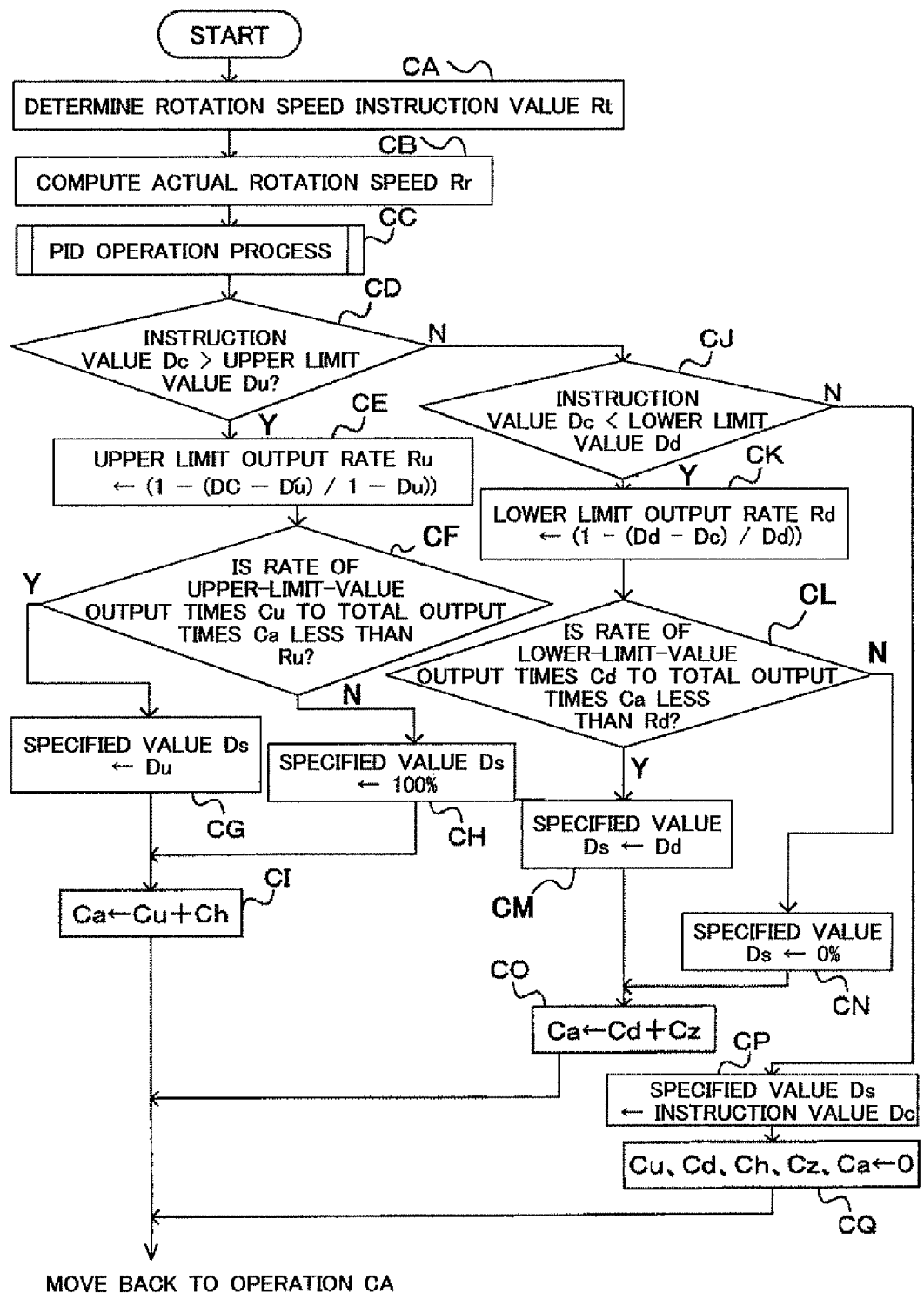
FIG. 9 is a flowchart explaining a second example of operations implemented by the processor.

An example of a process implemented by a processor 40 in the second embodiment is explained below. FIG. 9 is a flowchart explaining a second example of operations implemented by the processor 40. Operations from an operation CA to an operation CC are the same as the operations from the operation AA to the operation AC in FIG. 6. In an operation CD, the duty cycle specifying part 45 determines whether or not the duty cycle instruction value Dc is greater than the upper limit value Du. When the duty cycle instruction value Dc is greater than the upper limit value Du (Y in the operation CD), the process moves to an operation CE. When the duty cycle instruction value Dc is not greater than the upper limit value Du (N in the operation CD), the process moves to an operation CJ.

In the operation CE, the duty cycle specifying part 45 determines the upper limit output rate Ru. In an operation CF, the duty cycle specifying part 45 determines whether or not the rate (Cu/Ca) of the number of output times Cu to the total number Ca (Cu+Ch) of the output times Ch in which the duty cycle specified value Ds of "100%" has been output and the output times Cu in which the duty cycle specified value Ds same as the upper limit value Du has been output, is less than the upper limit output rate Ru. The rate (Cu/Ca) is less than the upper limit output rate Ru (Y in the operation CF), the process moves to an operation CG. The rate (Cu/Ca) is not less than the upper limit output rate Ru (N in the operation CF), the process moves to an operation CH.

In the operation CQ the duty cycle specifying part 45 sets the duty cycle specified value Ds to the upper limit value Du. Moreover, the duty cycle specifying part 45 increases by one the number of output times Cu in which the duty cycle specified value Ds same as the upper limit value Du has been output. Then the process moves to an operation CI. In the operation CH, the duty cycle specifying part 45 sets the duty cycle specified value Ds to "100%." Moreover, the duty cycle specifying part 45 increases by one the number of output times Ch in which the duty cycle specified value Ds of "100%" has been output. Then the process moves to the operation CI. In the operation CI, the duty cycle specifying part 45 updates the total number Ca=(Cu+Ch). Then the process moves back to the operation CA.

In the operation CJ, the duty cycle specifying part 45 determines whether or not the duty cycle instruction value Dc is less than the lower limit value Dd. When the duty cycle instruction value Dc is less than the lower limit value Dd (Y in the operation CJ), the operation moves to an operation CK. When the duty cycle instruction value Dc is not less than the lower limit value Dd (N in the operation CJ), the process moves to an operation CP.

In the operation CK, the duty cycle specifying part 45 determines the lower limit output rate Rd. In an operation CL, the duty cycle specifying part 45 determines whether or not the rate (Cd/Ca) of the number of output times Cd to the total number Ca=(Cd+Cz) of the output times (Cz) in which the duty cycle specified value Ds of "0% has been output and the output times (Cd) in which the duty cycle specified value Ds same as the lower limit value Dd has been output, is less than the lower limit output rate Rd. When the rate (Cd/Ca) is less than the lower limit output rate Rd (Y in the operation CL), the process moves to an operation CM. When the rate (Cd/Ca) is not less than the lower limit output rate Rd (N in the operation CL), the process moves to an operation CN.

In the operation CM, the duty cycle specifying part 45 sets the duty cycle specified value Ds to the lower limit value Dd. Moreover, the duty cycle specifying part 45 increases by one the number of output times Cd in which the duty cycle specified value Ds same as the lower limit value Dd has been output. Then the process moves to an operation CO. In the operation CN, the duty cycle specifying part 45 sets the duty cycle specified value Ds to "0%." Moreover, the duty cycle specifying part 45 increases by one the number of output times Cz in which the duty cycle specified value Ds of "0%" has been output. Then the process moves to the operation CO. In the operation CO, the duty cycle specifying part 45 updates the total number Ca=(Cd+Cz). Then the process moves back to the operation CA.

In an operation CP, the duty cycle specifying part 45 sets the duty cycle instruction value Dc to the duty cycle specified value Ds. In an operation CQ, the duty cycle specifying part 45 initializes the numbers of output times Cu, Cd, Ch, Cz and Ca that are variables for counting, to "0" (zero). Then the process moves back to the operation CA.

The duty cycle specifying part 45 in the second embodiment sets the average value of the duty cycles of the phase current control signal to the duty cycle instruction value Dc greater than the upper limit value Du by using the duty cycle specified value Ds having a value equal to or less than the upper limit value Du and the duty cycle specified value Ds of "100%." Therefore, even when the duty cycle is greater than the upper limit value Du, without generating a phase current control signal at which the loss by switching may occur, the PWM control can be implemented at the duty cycle instruction value Dc greater than the upper limit value Du. As a result, the loss by switching is reduced, and efficiency in the PWM control is improved. In addition, a dead band in which the PWM control becomes uncontrollable can be prevented from occurring in a range of the rotation speed caused by the duty cycle which exceeds the upper limit value Du.

Moreover, the duty cycle specifying part 45 in the second embodiment sets the average value of the duty cycles of the phase current control signal to the duty cycle instruction value De which is below the lower limit value Dd by using the duty cycle specified value Ds having a value equal to or greater than the lower limit value Dd and the duty cycle specified value Ds of "0%." Therefore, even when the duty cycle is less than the lower limit value Dd, without generating a phase current control signal at which the loss by switching may occur, the PWM control can be implemented at the duty cycle instruction value Dc less than the lower limit value Dd. As a result, the loss by switching is reduced, and the efficiency in the PWM control is improved. In addition, a dead band in which the PWM control becomes uncontrollable can be prevented from occurring in a range of the rotation speed caused by the duty cycle which is below the lower limit value Dd.

In the embodiment described above, the duty cycle instruction value Dc greater than the upper limit value Du is realized by the average value of the upper limit value Du and the duty cycle specified value Ds of "100%." In a modification of the duty cycle specifying part 45 may realize the duty cycle instruction value De by averaging the duty cycle specified value Ds less than the upper limit value Du and the duty cycle specified value Ds of "100%." Similarly, another modification of the duty cycle specifying part 45 may realize the duty cycle instruction value Dc by averaging the duty cycle specified value Ds greater than the lower limit value Dd and the duty cycle specified value Ds of "0%."

Figure 10:
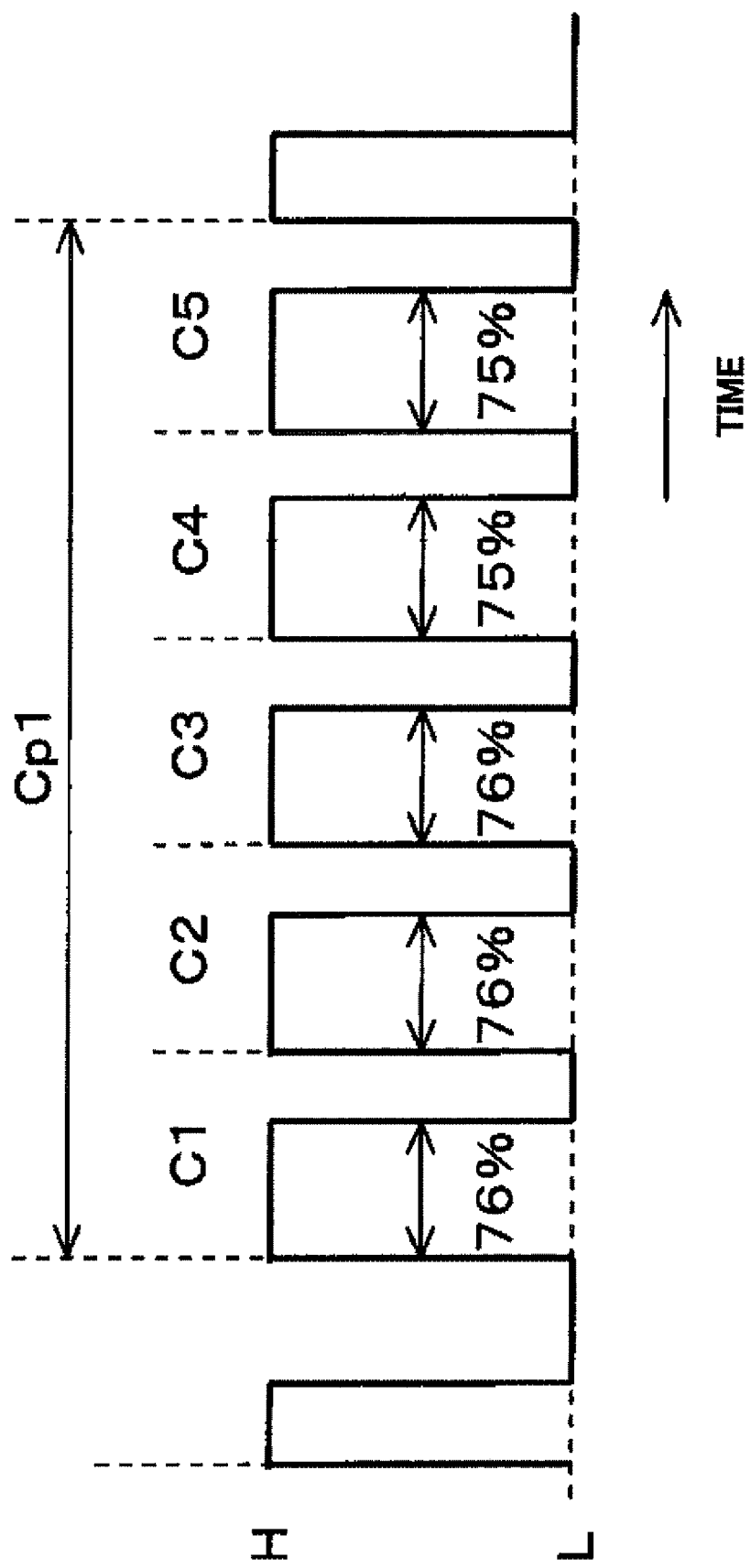
FIG. 10 is a timeline chart illustrating a second example of a phase current control signal.

Moreover, in the embodiment described above, the duty cycle instruction value Dc greater than the upper limit value Du or less than the lower limit value Dd is realized by averaging the plurality of different duty cycle specified values Ds. A modification of the duty cycle specifying part 45 may realize the duty cycle instruction value Dc greater than the lower limit value Dd and also less than the upper limit value Du by averaging a plurality of different duty cycle specified values Ds. FIG. 10 is a timeline chart illustrating a second example of the phase current control signal.

For example, when the duty cycle instruction value Dc is "75.6%," the duty cycle specifying part 45 realizes an average value Da of "75.6%" of duty cycles of the phase current control signal in a PWM cycle set Cp1 including PWM cycles C1 to C5 by the duty cycle specified value Ds of setting the PWM cycles C1 to C3 to "76%" and the duty cycle specified value Ds of the PWM cycles C4 to C5 to "75%."

According to this embodiment, regardless of a width of the duty cycle specifiable to a drive element determination part 46 that generates the phase current control signal, an arbitrary value of the duty cycle can be realized. For example, a duty cycle having a width narrower than the width of the duty cycle specifiable to the drive element determination part 46 can be realized.

Moreover, in addition to specifying to the duty cycle instruction value Dc the average value of the duty cycles which is used in implementing the PWM control by using two different duty cycles of the phase current control signal, an average value of the duty cycles which is used in implementing the PWM control by using three or more different duty cycles may be set as the duty cycle instruction value Dc.

<3. Third Embodiment>

Figure 11:
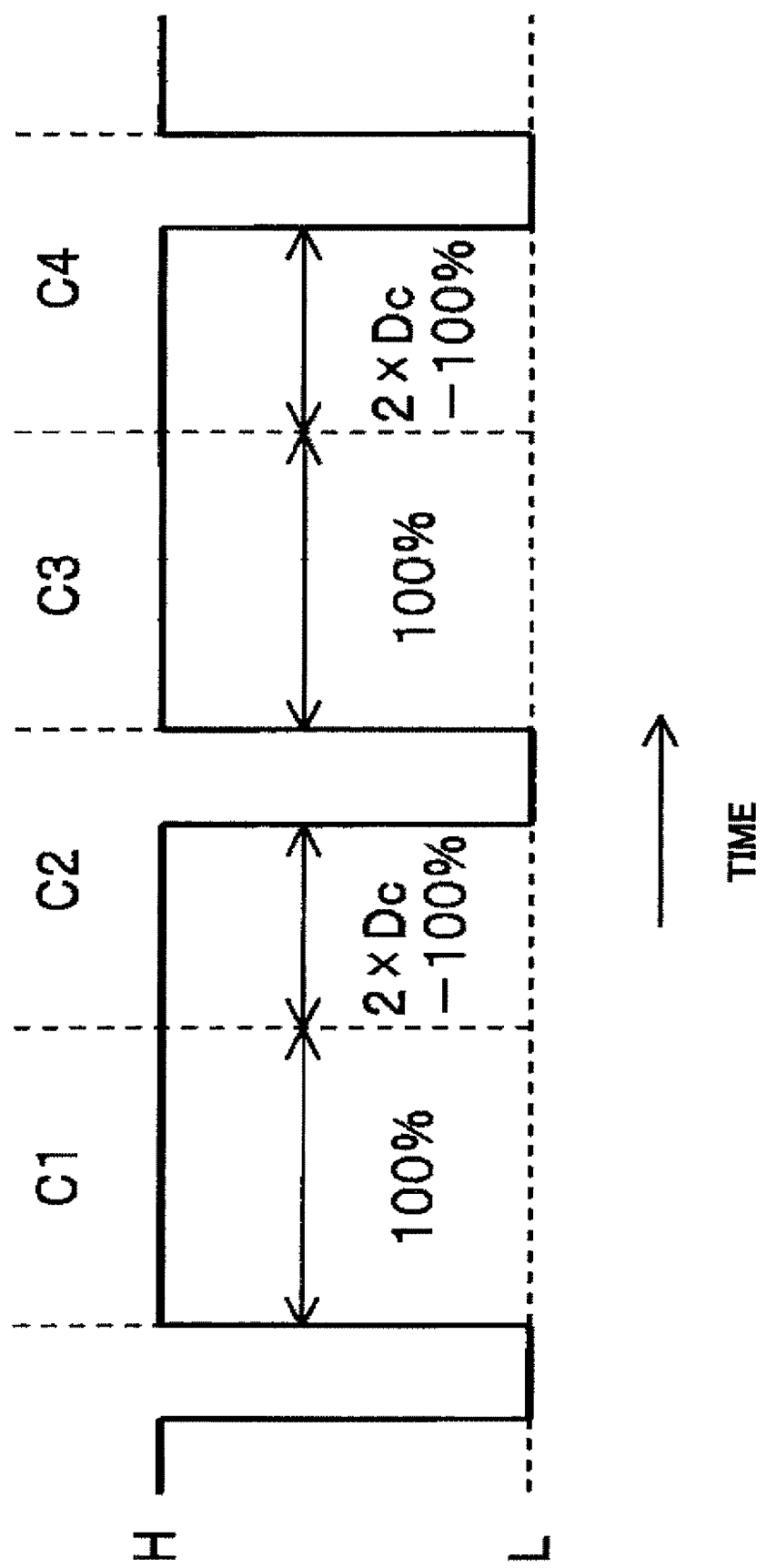
FIG. 11 is a timeline chart illustrating a third example of a phase current control signal.

Next, another embodiment of the electrically assisted hydraulic power steering apparatus 1 is explained. FIG. 11 is a timeline chart illustrating a third example of a phase current control signal. A duty cycle specifying part 45 in this embodiment causes duty cycles of a phase current control signal in two consecutive PWM cycles to be different from one another, and then determines the duty cycles of the phase current control signal to make an average value of the duty cycles to be a duty cycle instruction value Dc.

For example, the duty cycle specifying part 45 alternately specifies "100%" and a value (2×Dc−100%) as a duty cycle specified value Ds when the duty cycle instruction value Dc is greater than an upper limit value Du. FIG. 11 is the timeline chart illustrating the phase current control signal controlled in this embodiment. When the duty cycle instruction value Dc is greater than the upper limit value Du, the phase current control signal repeats a pair of PWM cycle including first PWM cycles C1 and C3 in which the duty cycle is "100%" and second PWM cycles C2 and C4 in which the duty cycle is (2×Dc−100%).

By controlling the duty cycle of the phase current control signal as described above, without generating a phase current control signal in which a loss by switching may occur because the duty cycle is greater than the upper limit value Du, the PWM control can be implemented at the duty cycle instruction value Dc greater than the upper limit value Du.

Similarly, the duty cycle specifying part 45 specifies a value of 0% and a value (2×Dc) alternately as the duty cycle specified value Ds when the duty cycle instruction value Dc is less than a lower limit value Dd.

Figure 12:
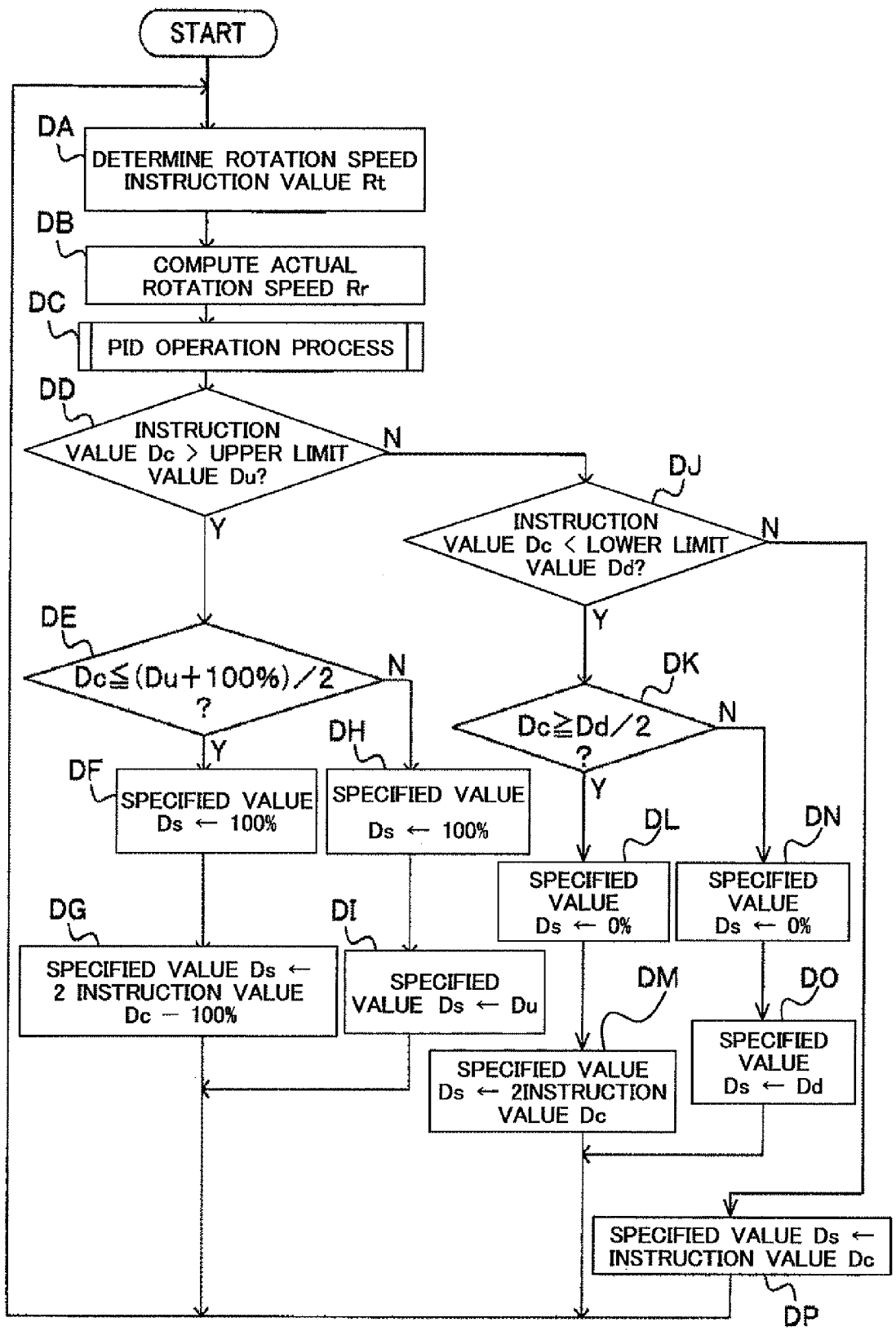
FIG. 12 is a flowchart explaining a third example of operations implemented by the processor.

FIG. 12 is a flowchart explaining a third example of a process implemented by the processor. An example of operations implemented by the processor 40 in the third embodiment is explained below. Operations from an operation DA to an operation DC is the same as the operations from the operation AA to the operation AC in FIG. 6. In an operation DD, the duty cycle specifying part 45 determines whether or not the duty cycle instruction value Dc is greater than the upper limit value Du. When the duty cycle instruction value Dc is greater than the upper limit value Du (Y in the operation DD), the process moves to an operation DE. When the duty cycle instruction value Dc is not greater than the upper limit value Du (N in the operation DD), the process moves to an operation DJ.

In the operation DE, the duty cycle specifying part 45 determines whether or not the duty cycle instruction value Dc is less than an average value ((Du+100%)/2) of the upper limit value Du and "100%." When Dc≤((Du+100%)/2) (Y in the operation DE), the process moves to an operation DF. When the duty cycle instruction value Dc is greater than ((Du+100%)/2) (N in the operation DE), the operation move to an operation DH.

In the operation DF, the duty cycle specifying part 45 sets the duty cycle specified value Ds to "100%." In an operation DG, the duty cycle specifying part 45 sets the duty cycle specified value Ds for a following PWM cycle to (2×Dc−100%). Then the process moves back to the operation DA.

When the duty cycle instruction value Dc is greater than ((Du+100%)/2), the value (2×Dc−100%) exceeds the upper limit value Du. Therefore, the duty cycle specifying part 45 outputs the upper limit value Du instead of the value (2×Dc−100%) in a PWM cycle following a PWM cycle in which the duty cycle specified value Ds of "100%" has been output. In other words, in the operation DH, the duty cycle specifying part 45 sets the duty cycle specified value Ds to "100%." In an operation DI, the duty cycle specifying part 45 sets the duty cycle specified value Ds for the following PWM cycle to the upper limit value Du. Then the operation moves back to the operation DA.

In an operation DJ, the duty cycle specifying part 45 determines whether or not the duty cycle instruction value Dc is less than the lower limit value Dd. When the duty cycle instruction value Dc is less than the lower limit value Dd (Y in the operation DJ), the process moves to an operation DK. When the duty cycle instruction value Dc is not less than the lower limit value Dd (N in the operation DJ), the process moves to an operation DP.

In the operation DK, the duty cycle specifying part 45 determines whether or not the duty cycle instruction value Dc is equal to or greater than an average value (Dd/2) of the lower limit value Dd and "0%." When Dc≥(Dd/2) (Y in the operation DK), the process moves to an operation DL. When Dc is less than (Dd/2) (N in the operation DK), the process moves to an operation DN.

In the operation DL, the duty cycle specifying part 45 sets the duty cycle specified value Ds to "0%." In an operation DM, the duty cycle specifying part 45 sets the duty cycle specified value Ds for a following PWM cycle to a value (2×Dc). Then the operation moves back to the operation DA.

When the duty cycle instruction value Dc is less than (Dd/2), the value (2×Dc) is less than the lower limit value Dd. Therefore, the duty cycle specifying part 45 outputs the lower limit value Dd instead of the value (2×Dc) in a PWM cycle following a PWM cycle in which the duty cycle specified value Ds of "0%" has been output. In other words, in the operation DN, the duty cycle specifying part 45 sets the duty cycle specified value Ds to "0%." In an operation DO, the duty cycle specifying part 45 sets the duty cycle specified value Ds for the following PWM cycle to the lower limit value Dd. Then the operation moves back to the operation DA.

In an operation DP, the duty cycle specifying part 45 sets the duty cycle instruction value Dc to the duty cycle specified value Ds. Then the process moves back to the operation DA.

According to this embodiment, it is possible to set the average value of the duty cycles of the phase current control signal to the duty cycle instruction value Dc greater than the upper limit value Du, in a simple method, by using the duty cycle specified value Ds having a value equal to or less than the upper limit value Du and the duty cycle specified value Ds of "100%." Therefore, even when the duty cycle is greater than the upper limit value Du, without generating a phase current control signal at which the loss by switching may occur, the PWM control can be implemented at the duty cycle instruction value Dc greater than the upper limit value Du. As a result, the loss by switching is reduced, and efficiency in the PWM control is improved. In addition, a dead band in which the PWM control becomes uncontrollable can be prevented from occurring in a range of the rotation speed caused by the duty cycle which exceeds the upper limit value Du.

Moreover, according to the this embodiment, it is possible to set the average value of the duty cycles of the phase current control signal to the duty cycle instruction value Dc less than the lower limit value Dd, in a simple method, by using the duty cycle specified value Ds having a value equal to or greater than the lower limit value Dd and the duty cycle specified value Ds of "0%." Therefore, even when the duty cycle is less than the lower limit value Dd, without generating a phase current control signal at which the loss by switching may occur, the PWM control can be implemented at the duty cycle instruction value Dc less than the lower limit value Dd. As a result, the loss by switching is reduced, and efficiency in the PWM control is improved. In addition, the dead band in which the PWM control becomes uncontrollable can be prevented from occurring in a range of the rotation speed caused by the duty cycle which is below the lower limit value Dd.

While the invention has been shown and described in detail, the foregoing description is in all aspects illustrative and not restrictive. It is therefore understood that numerous other modifications and variations can be devised without departing from the scope of the invention.

What is claimed is:

1. A motor controlling apparatus comprising:
a controller configured to (i) compute a target duty cycle value which is a target value for a duty cycle used for a pulse width modulation control for controlling a motor, (ii) when the target duty cycle value is below 100% and above an upper limit value which is below 100%, specify 100% as a duty cycle specified value for some of a plurality of consecutive pulse width modulation cycles and specify a value less than 100% as the duty cycle specified value for a remainder of the plurality of consecutive pulse width modulation cycles so that an average value of the duty cycles of the plurality of consecutive pulse width modulation cycles is equal to the target duty cycle value, and (iii) when the target duty cycle value is above 0% and less than a lower limit value which exceeds 0%, specify 0% as the duty cycle specified value for some of the plurality of consecutive pulse width modulation cycles and specify a value greater than 0% as the duty cycle specified value for the remainder of the plurality of consecutive pulse width modulation cycles so that the average value of the duty cycles of the plurality of consecutive pulse width modulation cycles is equal to the target duty cycle value; and
a control signal generator that generates a control signal for controlling the motor at the duty cycle specified value specified by the controller.

2. The motor controlling apparatus according to claim 1, wherein
the controller specifies two different duty cycles alternately for the duty cycle specified value.

3. The motor controlling apparatus according to claim 1, wherein
an ON period and an OFF period of the control signal are equal to or longer than a response time of a switching element used for the pulse width modulation control for controlling the motor.

4. A motor controlling apparatus comprising:
a controller configured to (i) compute a target duty cycle value which is a target value for a duty cycle used for a pulse width modulation control for controlling a motor, and (ii) specify a duty cycle specified value for each of a plurality of consecutive pulse width modulation cycles to make an average value of the duty cycles of the plurality of consecutive pulse width modulation cycles be the target duty cycle value computed by the controller, wherein a first value is specified as the duty cycle specified value for some of the plurality of consecutive pulse width modulation cycles, and a second value different from the first value is specified as the duty cycle specified value for a remainder of the plurality of consecutive pulse width modulation cycles so that the average value of the duty cycles of the plurality of consecutive pulse width modulation cycles is equal to the target duty cycle value; and
a control signal generator that generates a control signal for controlling the motor at the duty cycle specified value specified by the controller.

5. The motor controlling apparatus according to claim 4, wherein
the controller specifies 100% as the first value of the duty cycle specified value and specifies a value less than 100% and equal to or less than an upper limit value as the second value of the duty cycle specified value, when the target duty cycle value computed by the controller is greater than the upper limit value which is below 100%.

6. The motor controlling apparatus according to claim 5, wherein
an OFF period of the control signal based on the second value of the duty cycle specified value is equal to or longer than a response time of a switching element used for the pulse width modulation control for controlling the motor.

7. The motor controlling apparatus according to claim 4, wherein
the controller specifies 0% as the first value of the duty cycle specified value and specifies a value greater than 0% and equal to or greater than a lower limit value as the second value of the duty cycle specified value, when the target duty cycle value computed by the controller is less than the lower limit value which exceeds 0%.

8. The motor controlling apparatus according to claim 7, wherein
an ON period of the control signal based on the second value of the duty cycle specified value is equal to or longer than a response time of a switching element used for the pulse width modulation control for controlling the motor.

9. A motor controlling method comprising the steps of:
(a) computing a target duty cycle value which is a target value for a duty cycle used for a pulse width modulation control for controlling a motor;
(b) when the target duty cycle value is below 100% and above an upper limit value which is below 100%, specifying 100% as a duty cycle specified value for some of a plurality of consecutive pulse width modulation cycles and specifying a value less than 100% as the duty cycle specified value for a remainder of the plurality of consecutive pulse width modulation cycles so that an average value of the duty cycles of the plurality of consecutive pulse width modulation cycles is equal to the target duty cycle value, and when the target duty cycle value is above 0% and less than a lower limit value which exceeds 0%, specifying 0% as the duty cycle specified value for some of the plurality of consecutive pulse width modulation cycles and specifying a value greater than 0% as the duty cycle specified value for the remainder of the plurality of consecutive pulse width modulation cycles so that the average value of the duty cycles of the plurality of consecutive pulse width modulation cycles is equal to the target duty cycle value; and (c) generating a control signal for controlling the motor at the duty cycle specified value specified by the step (b).

10. The motor controlling method according to claim 9, wherein the step (b) specifies two different duty cycles alternately for the duty cycle specified value.

11. A motor controlling method comprising the steps of:

(a) computing a target duty cycle value which is a target value for a duty cycle used for a pulse width modulation control for controlling a motor;

(b) specifying a duty cycle specified value for each of a plurality of consecutive pulse width modulation cycles to make an average value of the duty cycles of the plurality of consecutive pulse width modulation cycles be the target duty cycle value computed by the step (a), wherein a first value is specified as the duty cycle specified value for some of the plurality of consecutive pulse width modulation cycles, and a second value different from the first value is specified as the duty cycle specified value for a remainder of the plurality of consecutive pulse width modulation cycles so that the average value of the duty cycles of the plurality of consecutive pulse width modulation cycles is equal to the target duty cycle value; and (c) generating a control signal for controlling the motor at the duty cycle specified value specified by the step (b).

12. The motor controlling method according to claim 11, wherein the step (b) specifies 100% as the first value of the duty cycle specified value and specifies a value less than 100% and equal to or less than an upper limit value as the second value of the duty cycle specified value, when the target duty cycle computed by the step (a) is greater than the upper limit value which is below 100%.

13. The motor controlling method according to claim 11, wherein the step (b) specifies 0% as the first value of the duty cycle specified value and specifies a value greater than 0% and equal to or greater than a lower limit value as the second value of the duty cycle specified value, when the target duty cycle computed by the step (a) is less than the lower limit value which exceeds 0%.

* * * * *